United States Patent
Ignatchenko et al.

(10) Patent No.: US 9,443,083 B2
(45) Date of Patent: Sep. 13, 2016

(54) SYSTEMS, METHODS AND APPARATUSES FOR PROTECTION OF ANTIVIRUS SOFTWARE

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 23 days.

(21) Appl. No.: 14/245,578

(22) Filed: Apr. 4, 2014

(65) Prior Publication Data

US 2014/0304819 A1 Oct. 9, 2014

Related U.S. Application Data

(60) Provisional application No. 61/808,931, filed on Apr. 5, 2013.

(51) Int. Cl.
*G06F 21/56* (2013.01)
*G06F 9/455* (2006.01)

(52) U.S. Cl.
CPC ......... *G06F 21/568* (2013.01); *G06F 9/45533* (2013.01); *G06F 2221/033* (2013.01)

(58) Field of Classification Search
CPC .......... H04L 63/1416; H04L 63/1408; H04L 63/1441; H04L 63/1458; G06F 21/552
USPC ................ 713/153–154, 187–188, 193–194; 726/1, 13, 22–33; 709/206, 249, 389
See application file for complete search history.

(56) References Cited

U.S. PATENT DOCUMENTS

2002/0169987 A1 11/2002 Meushaw et al.
2008/0184373 A1* 7/2008 Traut .................. G06F 9/45533
726/26

(Continued)

FOREIGN PATENT DOCUMENTS

WO     WO 2012/041385 A1     4/2012

OTHER PUBLICATIONS

International Search Report and Written Opinion mailed Jul. 10, 2014, as received in International Application No. PCT/IB2014/060445.

(Continued)

*Primary Examiner* — Evans Desrosiers
(74) *Attorney, Agent, or Firm* — Arnold & Porter LLP

(57) ABSTRACT

The systems, methods and apparatuses described herein provide a computing system for executing an antivirus software program. In one aspect, a non-transitory computer-readable medium may comprise an antivirus software program to be executed in a first virtual machine by a computer processor that supports multiple virtual machines. The antivirus software program may obtain access to a memory of a second virtual machine on the computer processor that supports multiple virtual machines, and use the access to the memory of the second virtual machine to monitor the memory of the second virtual machine and take a corrective action. In a further aspect, the corrective action may be to remove any malware found on a computer operating system that is running on the second virtual machine.

16 Claims, 3 Drawing Sheets

(56) References Cited

U.S. PATENT DOCUMENTS

2010/0043073 A1* 2/2010 Kuwamura ............ G06F 21/56
  726/24
2014/0095822 A1* 4/2014 Shiga .................. G06F 12/1441
  711/163

OTHER PUBLICATIONS

U.S. Appl. No. 61/791,632, filed Mar. 15, 2013.
U.S. Appl. No. 61/808,774, filed Apr. 5, 2013.

* cited by examiner

SYSTEMS, METHODS AND APPARATUSES FOR PROTECTION OF ANTIVIRUS SOFTWARE

RELATED APPLICATIONS

This application claims priority to U.S. Provisional Application No. 61/808,931, filed Apr. 5, 2013, entitled "SYSTEMS, METHODS AND APPARATUSES FOR PROTECTION OF ANTIVIRUS SOFTWARE," the content of which is incorporated herein by reference in its entirety.

BACKGROUND

Antivirus software applications play an important role in protecting modern operating systems. Unfortunately, modern antivirus software applications need not only to detect viruses, but also need to protect themselves against viruses. In particular, zero-day attacks may occur during a vulnerability window that exists in the time between when a vulnerability is first exploited and when software developers start to develop and publish a counter to that threat.

Embodiments according to the present disclosure may prevent an antivirus software application from being circumvented or stopped by viruses. In addition, these embodiments may reduce the attack window for an update process when a zero-day attack is found and announced.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
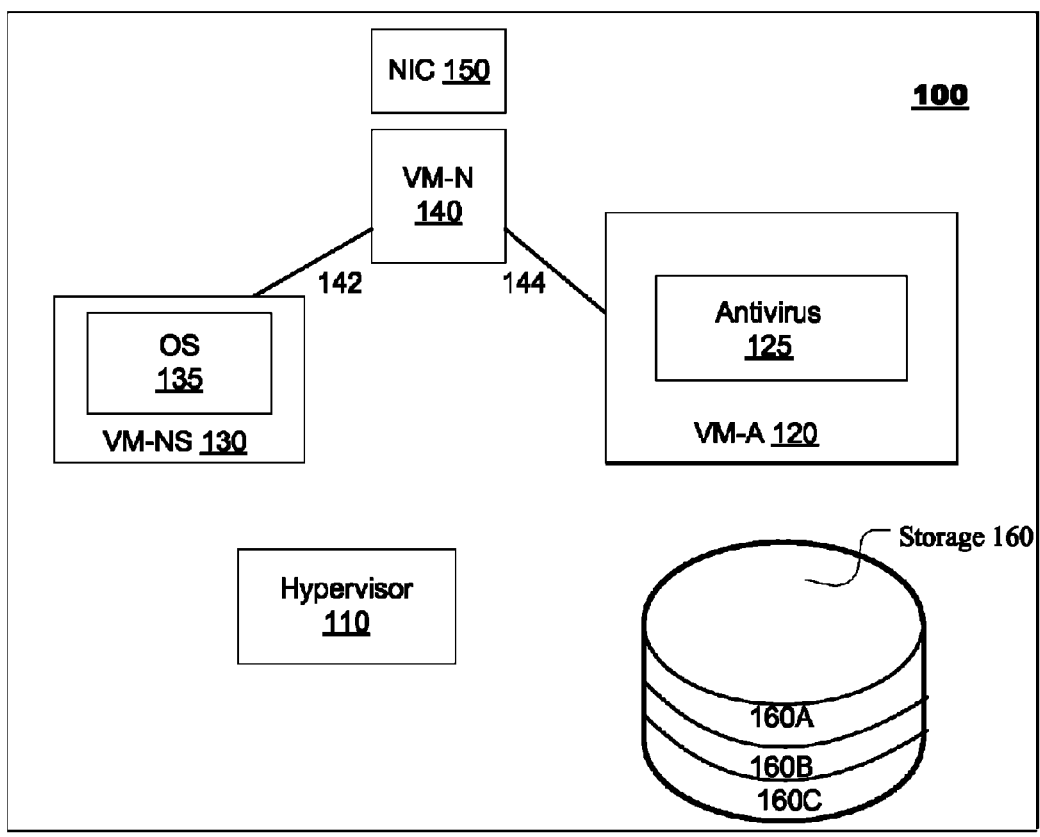
FIG. 1 is a block diagram of an exemplary computer system according to the present disclosure.

FIG. 1 shows an exemplary embodiment of the computer system 100 according to present disclosure. The computer system 100 may be, for example, a server or desktop computer, and also may be a smartphone, a tablet or PDA. The computer system 100 may comprise a computer processor configured to run a hypervisor 110 and a plurality of virtual machines (VMs) on the computer system 100. The plurality of VMs may be initialized and monitored by the hypervisor 110, and may include a VM-NS 130, a VM-A 120 and a VM-N 140. The VM-NS 130 may run an operating system OS 135, which may be, for example, a traditional OS, such as WINDOWS, LINUX, UNIX, ANDROID, etc. The VM-A 120 may run an antivirus software application 125, which may be referred to as antivirus 125 hereinafter. The antivirus 125 may run within a traditional OS or a special OS, or without any OS. The VM-N 140 may be configured to handle network communications for the computer system 100 and may be connected to a network interface card (NIC) 150 of the computer system 100. In some embodiments, the VM-N 140 may be in control of the NIC 150.

The computer system 100 may further comprise a storage 160. The storage 160 may be an internal or external redundant array of independent disks (RAID) array, hard disk drive (HDD), solid state drive (SSD), storage area network (SAN), flash memory, etc. In some embodiments, the storage 160 may physically reside outside of an enclosure of the computer system 100. Moreover, as shown in FIG. 1, the storage 160 may be logically separated into logical volumes 160A and 160B, and an optional logical volume 160C. Such separation may be achieved, for example, at RAID controller level, which may provide, for example, separate SCSI devices for the logical volumes 160A, 160B and 160C. In another example, existing virtualization techniques (for example, those which are used in VMWARE® products, such as VMWARE® Workstation) may be used to provide logical volumes on top of one or more underlying file systems and/or partitions. In some embodiments, the volume 160A may be used outside of the VM-NS 130 (i.e., not available as a storage for the VM-NS 130), and the volume 160B may be used to form a virtual drive for the VM-NS 130 and OS 135.

The VM-NS 130 and VM-A 120 may be coupled to the VM-N 140 by the links 142 and 144 respectively. In some embodiments, the links 142 and 144 may be virtual network links and the VM-N 140 may run a virtual router for other VMs of the computer system 100 to communicate with external computer systems via the NIC 150. That is, from the point of view of the antivirus 125 and OS 135, the communication with the VM-N 140 may be a network communication. If a network link used by a VM is a virtual network connection, the VM using the virtual network may implement drivers for the virtual network card, for example, similar to the way how virtual network is implemented in a VMWARE® Workstation product.

In some other embodiments, the VM-N 140 may contain the network stack, which may, in some embodiments, include a TCP/IP stack, to handle communications on behalf of other VMs of the computer system 100. For example, the link 144 may be implemented as a shared memory block between the VM-A 120 and VM-N 140. The hypervisor 110 may allocate one or more segments of the physical memory of the computer system 100 and grant both VM-A 120 and VM-N 140 access to these allocated memory segments. These memory segments may thus form a shared memory block (i.e., the link 144) between the VM-A 120 and VM-N 140. Depending on the implementations, the access to the shared memory block may be concurrent or interleaved, and each of the VM-A 120 and VM-N 140 may write to and read from the memory block when it has been granted access to the memory block. This approach may allow the network stack (or some parts of it) to be removed from the VM-A 120 and thus, reduce the attack surface of the antivirus 125. The link 142 between the VM-NS 130 and VM-N 140 may be implemented as a shared memory block shared by both the VM-NS 130 and VM-N 140 as well to allow the network stack (or some parts of it) be removed from the VM-NS 130. In another embodiment, the link 144 may be implemented as a shared memory block as described above, and the link 142 may be implemented as a network link (with VM-N 150 acting as a virtual router for the link 142).

Figure 2A:
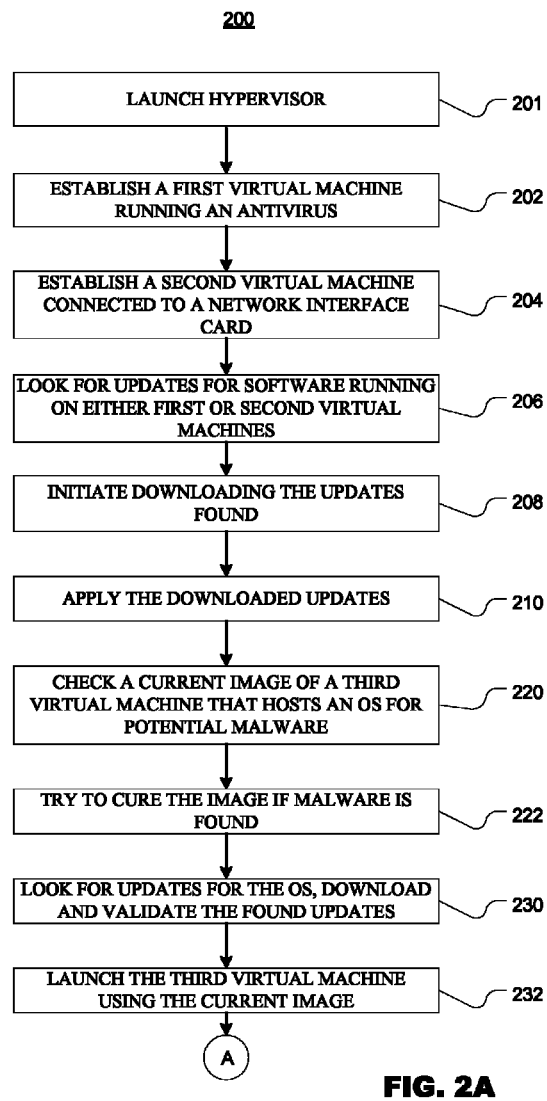
FIGS. 2A and 2B illustrate a flow diagram of an exemplary process according to the present disclosure.
Figure 2B:
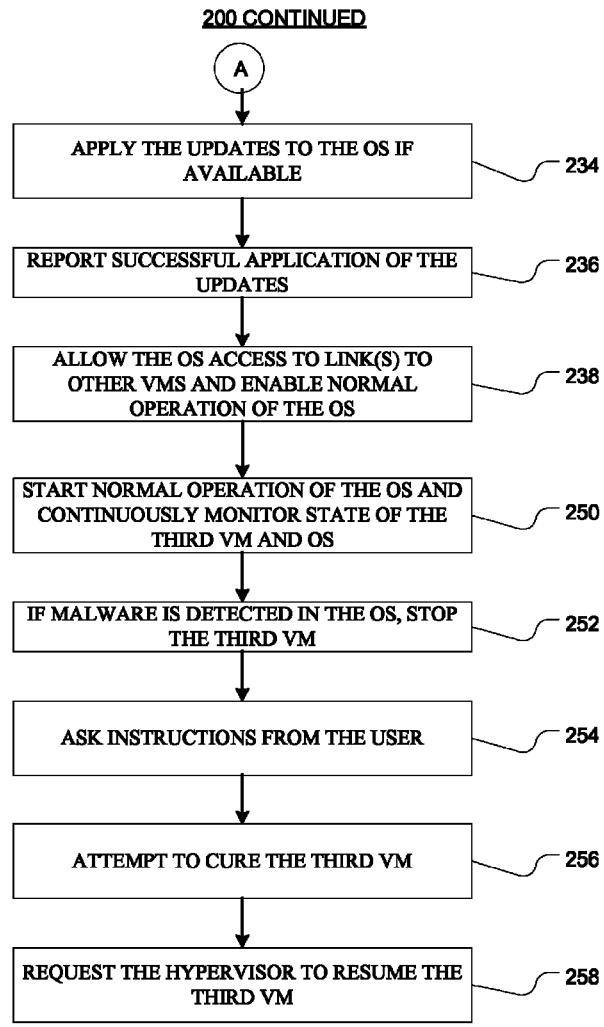

FIGS. 2A and 2B illustrate an exemplary process 200 according to the present disclosure. At block 201, hypervisor 110 may be launched within a computer system 100 (for example, boot or reboot of computer system 100 may be performed, resulting in launch of hypervisor 110). At block 202, a first virtual machine running an antivirus application may be created in the computer system 100. For example, the hypervisor 110 may create the VM-A 120 with the antivirus 125 running within it (without any peripheral devices attached). Then at block 204, a second virtual machine connected to a network interface card may be established. For example, the hypervisor 110 may create the VM-N 140 and attach it to the NIC 150 (such attaching may be done using usual virtual machine device handling techniques, which in some cases may involve using IOMMU or VT-d technology). Then at block 206, an update for either the antivirus or software running on the second virtual machine may be looked for. For example, the antivirus 125 may look for an update on the Internet via the link 144, VM-N 140, and NIC 150. It should be noted that the term update may refer to a number of updates collectively and thus may includes more than one piece of update.

At block 208, any update found may be downloaded. For example, if an update to either antivirus 125, or software running within VM-N 140, is found, the antivirus 125 may initiate downloading it, for example, to the volume 160A. Then at block 210, the downloaded update may be applied. In some embodiments, after the download is completed, the downloaded update may be validated before being applied. In some embodiments, applying the update may be implemented by requesting the hypervisor 110 to restart the appropriate VM with a completely new downloaded image. This may require that the downloaded update include a full image of the appropriate VM and allow all malware in the existing instance of the VM to be removed (as the image is completely new). In other embodiments, the downloaded update may be passed to the appropriate VM for the update to be applied. It should be noted that the blocks 206-210 may be optional in some embodiments.

The process 200 may then proceed to an optional block 220, at which the antivirus may check a current image of a third virtual machine that hosts an OS for potential malware. For example, the third virtual machine that hosts an OS may be the VM-NS 130 and antivirus 125 may check the current image of the VM-NS 130 for potential malware (on the OS 135 or any software applications running on the OS 135). As the VM-NS 130 is not running at this point, the check may be done in a manner simpler than that of a running system. Then at block 222, if any malware is found, the antivirus may attempt to cure the image, for example, by trying to remove the malware. In some embodiments, the antivirus 125 may optionally ask for instructions from a user (for example, via keyboard/mouse/screen, etc.). At block 230, the antivirus (e.g., antivirus 125) may look for an update for the OS (e.g., the OS 135), and download and validate the found update.

At block 232, the hypervisor 110 may launch the VM-NS 130 using the current image checked in block 220, with attached peripheral devices which may include video card, keyboard, volume 160B, other storage, etc. (not shown). The image may contain a current image of the OS and may include any modifications made in block 222 in an attempt to remove malware. In some embodiments, the VM-A 120 may obtain (e.g., request and be given) access to all the memory of the VM-NS 130 at this stage (in some embodiments access may be restricted to read-only access), and the VM-NS 130 may have access to volumes 160B and 160C but not access to the link 142. Absence of access to the link 142 may ensure that if there is an existing network attack on the OS 135, the attackers may not reach the OS 135 until the update is applied.

At block 234, the update may be applied to the OS 135. For example, the OS 135 may find out about the update (for example, by detecting that the volume 160C is present and/or contains an update, or receiving a notification from the hypervisor 110, or by other ways), and apply it. At block 236, if the update is successfully applied, the OS 135 may report about it to the hypervisor 110. In some embodiments, the antivirus 125 may optionally check (for example, by obtaining and using access to the memory of the VM-NS 130) that the update is indeed successfully applied and report it to the hypervisor 110. When the hypervisor 110 is satisfied (which may, depending on embodiment, require either a report from the OS 135, or a report from the antivirus 125, or both) that the update is indeed successfully applied, at block 238, the hypervisor 110 may allow the VM-NS 130 to access the link 142 and enable the normal operation of the VM-NS 130.

At block 250, the normal operation of the OS 135 may start. During this block, the antivirus 125 may continue to monitor the state of the VM-NS 130 and OS 135 (e.g., via access to the memory of the VM-NS 130), and to detect if malware is present within the OS 135. If malware is detected, the antivirus 125 may react accordingly. For example, in some embodiments, the antivirus 125 may implement operations in blocks 252, 254, 256 and 258. At block 252, the antivirus 125 may request the hypervisor 110 to stop the VM-NS 130 and to temporarily re-attach a video card and a keyboard (not shown) to VM-A 120. In some embodiments, the antivirus 125 may also store the current image of the VM-NS 130, for example, in the volume 160A. Then, at block 254, the antivirus 125 may ask for instructions from a user via a screen and keyboard/mouse. At block 256, the antivirus 125 may attempt to remove the found malware from the current image of the VM-NS 130. At block 258, the antivirus 125 may request the hypervisor 110 to resume the VM-NS 130 from (potentially cured) current image of VM-NS 130.

Alternatively, in some other embodiments, if malware is detected at block 250, the antivirus 125 may attempt to remove the malware while the VM-NS 130 is running, or request to stop it and manipulate its memory directly, without storing the VM-NS 130 as a current image. In these alternative embodiments, the antivirus 125 may need write access to the memory of the VM-NS 130. Such write access may be granted by the hypervisor 110 to the antivirus 125 at all the times, or may be granted only when explicitly requested by the antivirus 125.

During the block 250, the antivirus 125 may additionally look for information about update(s) to the antivirus 125, and/or software of the VM-N 140, and/or OS 135. This may be implemented, for example, via polling (for example, via link 144, VM-N 140, and network card 150), or via subscription to a "push" notification. If an update to the antivirus 125 or VM-N 140 is detected, the update may be downloaded and applied in a manner similar to that described with respect to blocks 208-210. In some embodiments, the update lookup and application may be done without disrupting the operation of the VM-NS 130. If a security-critical update to the OS 135 is detected, the antivirus 125 may request the hypervisor 110 to disable the link 142 while the update is downloaded and applied, to reduce the vulnerability window of the OS 135.

In some embodiments, the antivirus 125 during the block 250 may have access not only to the memory of the VM-NS 130, but also to CPU registers of the VM-NS 130. Such access may be implemented, for example, via a request to the hypervisor 110. For example, the hypervisor 110 may temporarily pause the VM-NS 130, read the state of the CPU registers of the VM-NS 130, report the state of the CPU registers to the antivirus 125, and then resume the VM-NS 130. In some embodiments, the hypervisor 110 may additionally create a temporary snapshot of the VM-NS 130 at this point, thereby allowing the antivirus 125 to work with a consistent temporary image of the VM-NS 130. Such a snapshot may be implemented, for example, based on a copy-on-write technique, so pages which are about to be written by the VM-NS 130, may be copied to another location (for example, in RAM, or within the volume 160A) accessible to the antivirus 125.

In some embodiments, there may be an additional antivirus agent (not shown), running within the OS 135. The additional antivirus agent may be, for example, a program somewhat similar to a usual antivirus program. The antivirus agent may be used, for example, for real-time protection from attacks (for example, when data is about to be loaded, such as when inserting a CD, or browsing the web, or when a file already within the OS 135 is about to be opened or executed). In some embodiments, the antivirus 125 may monitor that the antivirus agent is running and/or is not modified during the block 250. If the antivirus 125 detects that the antivirus agent is not running and/or is modified—which might indicate that an attack is in progress, the antivirus 125 may take any appropriate actions. For example, in addition to or instead of usual checks for updates and attempt to cure OS 135 as described above, in some cases the antivirus 125 may request the hypervisor 110 to pause the VM-NS 130, to report the problem to a user, and if the user allows—to communicate with an antivirus response team (potentially including snapshot of VM-NS 130 in the communication), to wait for an update to the antivirus 125 to be provided, to download and apply the update to the antivirus 125, and then to attempt to cure the OS 135.

It should be noted that in some cases, all or part of functionality of the antivirus 125 may be implemented as a part of the hypervisor 110.

Moreover, it should also be noted that in some embodiments, the system described on FIG. 1 may be implemented on top of a system described in U.S. Provisional Patent Application Nos. 61/791,632 (the '632 application), filed on Mar. 15, 2013, and/or 61/808,774, filed on Apr. 5, 2013, both of which are entitled "Secure Zone on a Virtual Machine for Digital Communications," the contents of both of which are incorporated by reference in their entirety herein. In this case, some or all of functionality of the antivirus 125 may be implemented within a supervisor as described therein.

It should be understood that when an image and/or update is mentioned within the scope of present embodiment, any known or future-developed techniques to ensure the validity of the image and/or update may be applied before the image and/or update is used. The known techniques may include, but are not limited to, checksums, cryptographic hashes, signatures, public-key infrastructure (PKI), etc.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computing system, comprising:
a memory; and
a computer processor communicatively coupled to the memory and configured to:
  initialize a hypervisor;
  establish a first virtual machine under the control of the hypervisor;
  load an antivirus software program from a non-volatile storage;
  execute the antivirus software program on the first virtual machine;
  establish a second virtual machine under the control of the hypervisor;
  load and execute a computer operating system on the second virtual machine;
  execute an antivirus agent on the second virtual machine, wherein the antivirus software monitors a running state of the software agent;
  pause execution of the computer operating system;
  grant the antivirus software program access to registers of the second virtual machine and to a portion of the memory allocated to the second virtual machine running the operating system, wherein the antivirus software program uses the access to the portion of the memory allocated to the second virtual machine to monitor state of the second virtual machine and take a corrective action, and wherein the antivirus software program takes corrective action upon detecting that the antivirus agent is not running or is modified on the second virtual machine.

2. The computing system of claim 1, wherein to monitor the state of the second virtual machine comprises to access the portion of the memory allocated to the second virtual machine to detect malware.

3. The computing system of claim 2, wherein to take the correction action comprises one of: to attempt to remove detected malware while the computer operating system is running, or to attempt to remove detected malware by requesting to stop the computer operating system and manipulating its memory directly.

4. The computing system of claim 1, wherein the computer operating system is loaded from an image and the computer processor is configured to check the image for malware using the antivirus software program before executing the computer operating system on the second virtual machine.

5. The computing system of claim 1, further comprising a network interface card (NIC), wherein the computer processor is further configured to:
 establish a third virtual machine under the control of the hypervisor to handle network communication through the NIC.

6. The computing system of claim 5, wherein the computer processor is further configured to:
 look for an update for the computer operating system through the network communication via the third virtual machine; and
 download and validate the update for the computer operating system.

7. The computing system of claim 1, wherein to take the correction action comprises:
 to remove detected malware while the computer operating system is running.

8. The computing system of claim 1, wherein to take the correction action comprises:
 to remove detected malware by requesting to stop the computer operating system and manipulating its memory directly.

9. A method for operating an antivirus software program on a computing system, comprising:
 establishing a first virtual machine on the computing system;
 loading and executing the antivirus software program on the first virtual machine;
 establishing a second virtual machine on the computing system, wherein the first virtual machine and the second virtual machine are established under the control of a hypervisor;
 loading and executing a computer operating system on the second virtual machine;
 executing an antivirus agent on the second virtual machine;
 pausing execution of the computer operating system;
 granting the antivirus software program access to registers of the second virtual machine and to a memory of the second virtual machine running the operating system;
 monitoring state of the second virtual machine and taking a corrective action using the antivirus software program; and
 monitoring a running state of the antivirus agent using the antivirus software and taking corrective action upon detecting that the antivirus agent is not running or is modified on the second virtual machine.

10. The method of claim 9, wherein monitoring the state of the second virtual machine comprises accessing the portion of the memory allocated to the second virtual machine to detect malware.

11. The method of claim 10, wherein taking the correction action comprises one of: attempting to remove detected malware while the computer operating system is running, or attempting to remove detected malware by requesting to stop the computer operating system and manipulating its memory directly.

12. The method of claim 9, further comprising checking an image of the computer operating system for malware using the antivirus software program before executing the computer operating system on the second virtual machine.

13. The method of claim 9, further comprising:
 establish a third virtual machine to access a network interface card and handle network communication for the first and second virtual machines.

14. The method of claim 13, further comprising:
 looking for an update for the computer operating system through the network communication via the third virtual machine; and
 downloading and validating the update for the computer operating system.

15. The method of claim 9, wherein taking the correction action comprises:
 removing detected malware while the computer operating system is running.

16. The method of claim 9, wherein taking the correction action comprises:
 removing detected malware by requesting to stop the computer operating system and manipulating its memory directly.

* * * * *